United States Patent [19]

Jameel et al.

[11] 3,789,332

[45] Jan. 29, 1974

[54] IN-LINE REED CAPSULE CROSSPOINT MATRIX SWITCH

[75] Inventors: Khaja M. Jameel, Elmhurst; Von W. Mueller, Lombard, both of Ill.

[73] Assignee: GTE Automatic Electric Laboratories, Incorporated, Northlake, Ill.

[22] Filed: Feb. 20, 1973

[21] Appl. No.: 334,184

[52] U.S. Cl. .................................. 335/152, 335/112

[51] Int. Cl. .......................................... H01h 67/30

[58] Field of Search ........... 335/112, 106, 108, 152; 200/166 L; 174/35 R, 35 MS

[56] References Cited

UNITED STATES PATENTS

| | | | |
|---|---|---|---|
| 3,445,728 | 5/1969 | Jorgensen et al. | 335/152 X |
| 3,170,089 | 2/1965 | Zielinski | 335/152 X |
| 3,500,267 | 3/1970 | Wasserman | 335/112 |
| 3,576,507 | 4/1971 | Kunz et al. | 335/152 |

*Primary Examiner*—Roy N. Envall, Jr.

*Attorney, Agent, or Firm*—David W. Heid

[57] ABSTRACT

A modular in - line crosspoint matrix switch having reed capsule assemblies each having reed capsules mounted in a bobbin, electromagnetic winding on each bobbin, the reed capsules and windings being wired to form the crosspoint matrix and further having zig-zag shield means arranged between adjacent rows of the bobbins.

18 Claims, 8 Drawing Figures

IN-LINE REED CAPSULE CROSSPOINT MATRIX SWITCH

BACKGROUND

In its simplified form the two major constituents of a modern telephone switching system are the common control equipment and the speech path switching network.

The common control equipment recognizes the call for service, receives the dialed information and after processing the information, attempts to set up a connection between the calling and the called parties. The speech path switching network is literally a gigantic switch built up from a large number of smaller switches which are interconnected in a complex manner. It is through this switch that an actual metallic contact is established between the two parties. Since there are a multiplicity of interconnecting configurations available within the switch, the same two parties could be connected to each other in a number of ways.

Taking full advantage of the recent developments in semiconductors and the availability of low cost devices for logic and memory applications, the system designers have managed to achieve a noticeable reduction in the physical size and the operational speed of the common control equipment. Unfortunately due to problems of noise and lack of isolation between the lines, which are some of the requirements which the speech circuits must satisfy, the point has still not been reached where semiconductors can be readily employed in speech path networks. Hence high speed electromechanical substitutes like the reed matrices or certain type of crossbar switches have to be employed for the speech path switching. The salient short comings of such devices are their size and their manufacturing cost which must be reduced in order to make the overall system competitive.

OBJECTS

One of the objects of the invention is to provide a new and improved in-line reed capsule crosspoint matrix switch which is substantially lower in cost, smaller in size and has better transmission characteristics than its existing counterparts.

Another object of the invention is to provide a new and improved in-line reed capsule crosspoint matrix switch in the form of a module in which the component parts are compactly arranged and can be readily and simply assembled and disassembled.

A further object of the invention is to provide a new and improved switch of the type described using ferrous metal multipling wires.

Still another object of the invention is to provide a new and improved switch of the type described which is characterized by improved shielding of the reed capsules and their associated magnetic windings in a manner which assists in concentrating flux and in preventing interaction between crosspoints.

Other advantages of the invention will appear from the following description in conjunction with the accompanying drawings.

THE DRAWINGS

BRIEF SUMMARY OF THE INVENTION

Essentially the invention comprises a new and improved modular in-line crosspoint matrix switch assembly, a new and improved multipling wire system and a new and improved shielding system.

The switch assembly comprises (a) a self-supporting molded electrically insulating housing having opposing sides defining a predetermined area; (b) a single printed circuit board connected to said housing to partially enclose said area, said circuit board containing thereon conductors with apertures therein at spaced intervals, said apertures being aligned obliquely in parallel relation in predetermined groups and longitudinally in parallel relation to one another; (c) a plurality of reed capsule assemblies each comprising two or more reed capsules mounted in a bobbin, said reed capsules each containing reed contact blades, said bobbins being formed of a molded electrical insulating material, means at one end of said bobbins to electrically connect said conductors of said circuit board and said reed blades of said reed capsules, a magnetic winding on each of said bobbins, means to electrically connect said windings to said obliquely arranged apertures in said circuit board; (d) a plurality of wires parallel to one another spaced from said circuit board, running longitudinally over said bobbins and connected to said reed contact blades; (e) means electrically connecting said wires of (d) to conductors of said circuit board of (b); (f) an electrically conducting sheet extending adjacent rows of said bobbins and longitudinally in zig-zag fashion to provide a shield, and (g) means for insulating said shield from said circuit board.

An important feature of the invention resides in the fact that the wires of (d) supra, which are usually referred to as "multipling wires", are made of a ferrous metal which improves the sensitivity of the crosspoint.

Another important feature of the invention resides in the fact that the shield of (f) supra, is constructed in a zig-zag fashion and is also made of a ferrous metal which helps to concentrate the flux and prevent interaction between crosspoints.

DETAILED DESCRIPTION OF THE INVENTION

Figure 1:
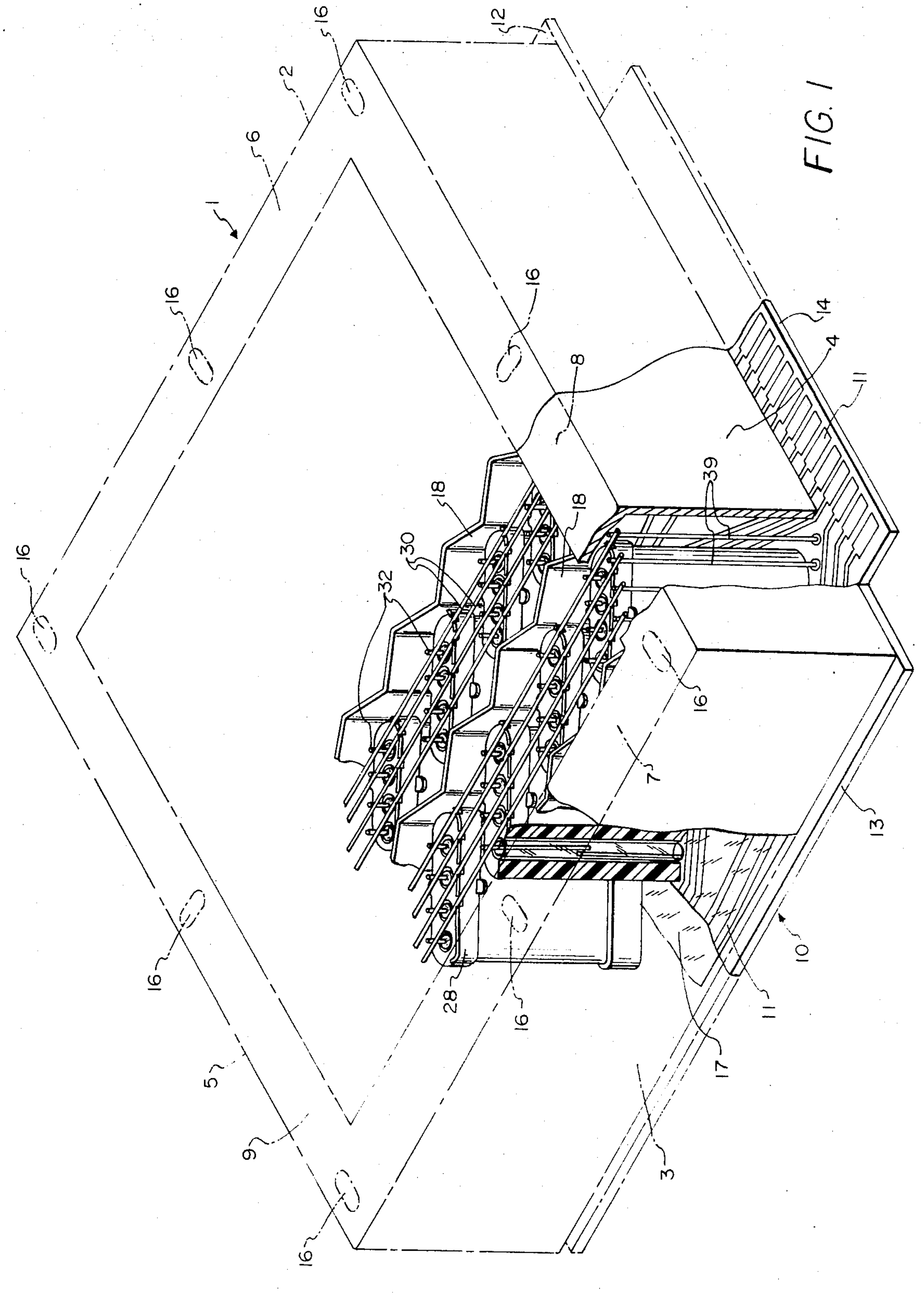
FIG. 1 is a perspective view partly in section with parts broken away and partly in phantom of an in-line reed capsule crosspoint matrix switch illustrating one embodiment of the invention.

Referring to the drawings, the switch module illustrated in FIG. 1 is made from a molded plastic material which has electrical insulating properties, for example, a resin re-enforced with glass fibers, and the housing 1 comprises opposing sides 2, 3, 4 and 5 having inwardly extending flange portions 6, 7, 8 and 9. The side walls 2, 3, 4 and 5 define a predetermined area which is partially enclosed by circuit board 10.

Circuit board 10 is a single printed circuit board containing on one side thereof suitable conductors 11 which apertures therein at predetermined locations adapted to receive connecting wires as hereinafter described, said apertures being aligned obliquely in parallel relation in predetermined groups and longitudinally in parallel relation to one another. The circuit board 10 preferably has extensions 12 and 13 which extend beyond each of the two opposing sides 2 and 3 and another extension 14 containing terminals of the conductors which extends beyond side 4. The side 5 of housing 1 (see FIG. 6) contains a handle 15 which is integrally molded. In actual use the module is normally grasped by the handle 15 and inserted into a suitable receiver with one of the sides 2 or 3 at the top and the other at the bottom. The housing 1 is secured to circuit board 10 by means of bolts, machine screws, or other suitable fastening devices inserted through holes 16 and corresponding aligned holes (not shown) in circuit board 10. An electrically insulating plastic sheet 17 (see FIG. 6) is disposed between housing 1 and the upper surface of circuit board 10. This sheet contains apertures aligned with the apertures in the circuit board and serves to insulate the shields 18 from the conductors on the circuit board.

The basic switching element of a reed type matrix switch is a reed capsule, which is a hermetically sealed switching contact comprised of two ferromagnetic metal reeds. The contacting tips of the reeds are swaged flat and coated with gold-silver alloy to improve the contact stability. The contact is closed under the influence of a magnetic field which is generated by a coil due to the flow of electrical current through the coil. The magnetic flux forces the two reeds to snap together thereby establishing a metallic contact. As soon as the energizing field is removed, the reeds spring apart under their own tension and the contact opens. The reed capsule and the associated energizing coil form a reed relay. When used in a matrix switch the reed relay is referred to as a corred. In its simplest form the correed consists of a bobbin on which is wound a coil and within which is inserted a reed capsule. A more complex correed has a bobbin on which are wound two coils and within which are inserted more than one reed capsule.

The matrix switch is a cluster of such correeds through which the incoming leads are switched to the outgoing leads. The correeds, more suitably referred to as "Crosspoints" are arranged on a card in a two dimensional array consisting of rows and columns. In order to fully appreciate the potential of the switching flexibility which a matrix switch could offer, it is necessary to understand the manner in which the crosspoints and the incoming and outgoing leads are arranged. Assume that the inlets are arranged in one plane as horizontal or X co-ordinated parallel lines and the outlets are arranged in another plane (parallel to the first plane) as vertical or Y co-ordinated parallel lines or vice versa. Further, assume that the crosspoints are sandwiched in between the planes in a manner that one crosspoint is dedicated to each inlet-outlet "Crossover". Now, by connecting the two ends of the reed capsule, situated in each crosspoint bobbin, to the respective inlet and outlet, a network is evolved through which any inlet could be switched to any outlet simply by energizing the crosspoint "common" to that particular inlet and outlet. This is the principle of co-ordinate switching and hence the matrix switch.

In the preceding description the inlets and outlets have been represented by singular leads, however, in telephone conversation switching, the inlets and outlets are comprised of two or four parallel leads. To accommodate this, each crosspoint is furnished with either two or four reed capsules so that all leads belonging to one conversation could be switched simultaneously. The matrix crosspoints are fitted with two windings, the inner winding is commonly referred to as the "Pull" winding. It is used in the first place to operate the reeds. The second winding is normally a lower power continuously rated winding and is commonly referred to as "Hole" winding. Once the reed contacts have been closed under the influence of the Pull winding, the Hold winding is electrically super-imposed on to the Pull winding in an aiding mode. The higher power Pull winding could now be de-energized leaving the crosspoint to sustain in an operated mode under the influence of the lower power Hold winding.

Figure 2:
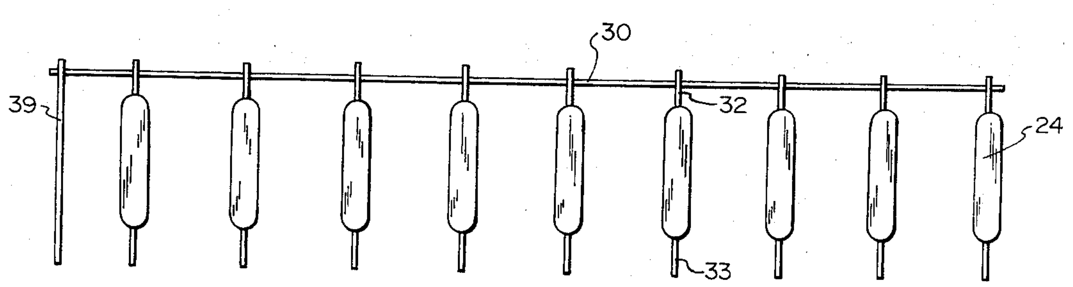
FIG. 2 is a side elevational view of a reed capsule multiple showing a plurality of reed capsules connected by a multipling wire employed in accordance with the invention.
Figures 3, 4, 5:
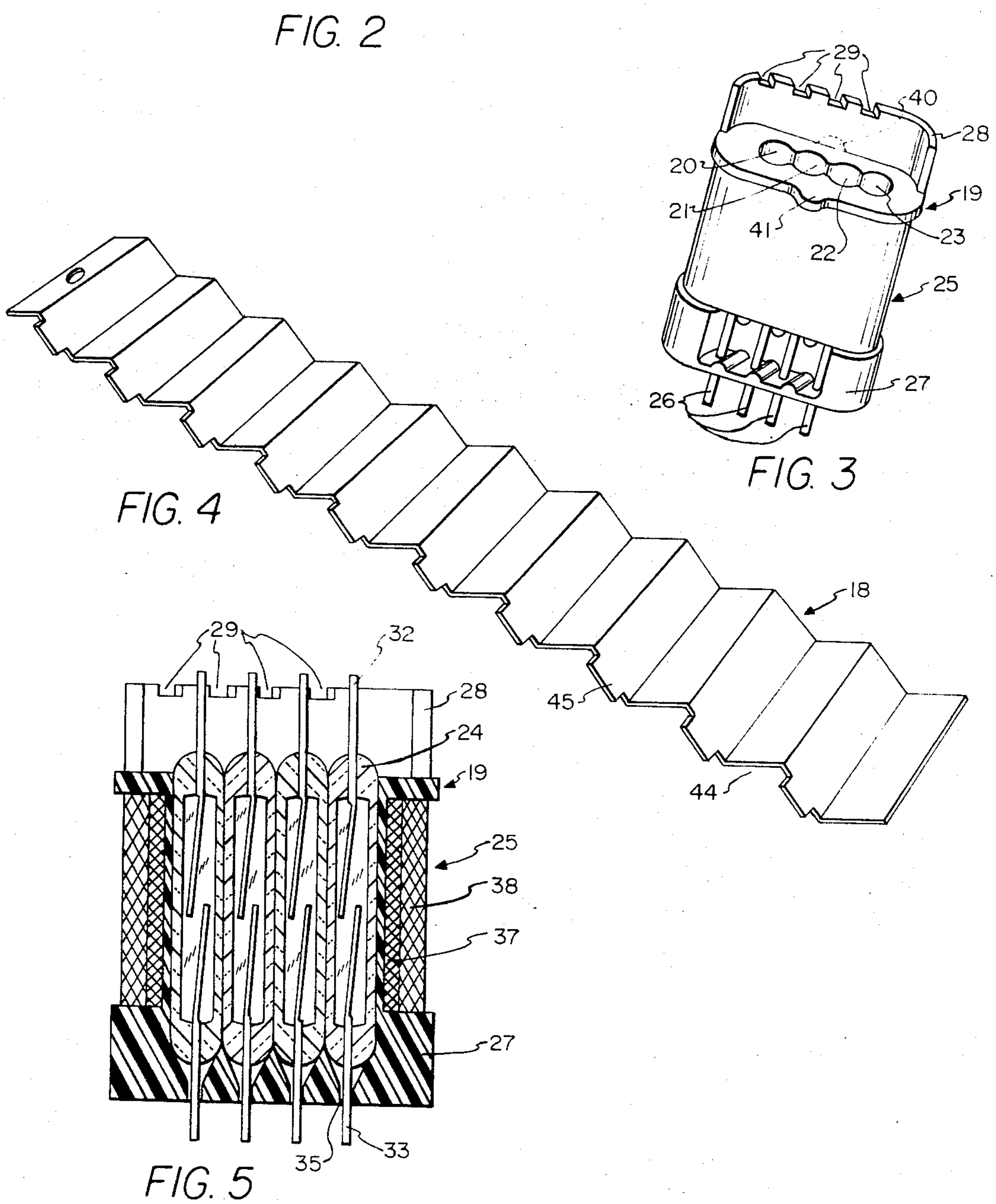
FIG. 3 is a perspective view of a bobbin containing a magnetic winding and adapted to receive four reed capsules which is employed in accordance with the invention.
FIG. 4 is a perspective view of a shield which is employed between rows of crosspoints and also adjacent the outer rows of crosspoints in a switch embodying the invention.
FIG. 5 is a cross sectional view of four reed capsules assembled in a bobbin of the type illustrated in FIG. 3.

In the bobbin 19 illustrated in FIG. 3 which is formed of a molded electrical insulating material, the passageways 20, 21, 22 and 23 are each adapted to receive a reed capsule 24, as shown in FIG. 2. The central part 25 of bobbin 19 contains one or more magnetic windings adapted to actuate the reed capsules and these windings are connected by wires 26 extending through openings in the bottom portion 27 of the molded bobbin and inserted into apertures in the conductors in the circuit board. Each bobbin 19 also contains an extension 28 molded into one end of the bobbin. The outer end of extension 28 contains grooves 29 which are obliquely arranged parallel to one another to receive multipling wires 30 (see FIG. 2). The multipling wires 30 are preferably made of ferromagnetic material such as soft iron and will usually have a diameter within the range of 0.025 to 0.035 inch, preferably approximately 0.025 inch. These wires 30 are connected preferably by welding to reed blades 32 as illustrated in FIG. 5. The other reed blade 33 in each of the reed capsules 24 passes through a hole 35 in the bottom of bobbin 19 to an aperture in circuit board 10. The various wires 26 connected to the magnetic windings on the bobbins 19 and reed blades 33 of reed capsules 24 project through the circuit board as illustrated at 36 in FIG. 6 and can be soldered or otherwise secured to the circuit board. Where it is desired to remove one or more of the reed capsule assemblies or the bobbins containing the capsules it is a relatively simple matter to de-solder these wires.

In the embodiment illustrated in FIG. 5 the inner winding 37 is a "Pull" winding and the outer winding 38 is a "Hold" winding.

Referring to FIG. 2 the multipling wire 30 is connected to the circuit board through wire 39 which is made of the same material as wire 30.

Figures 6, 7, 8:
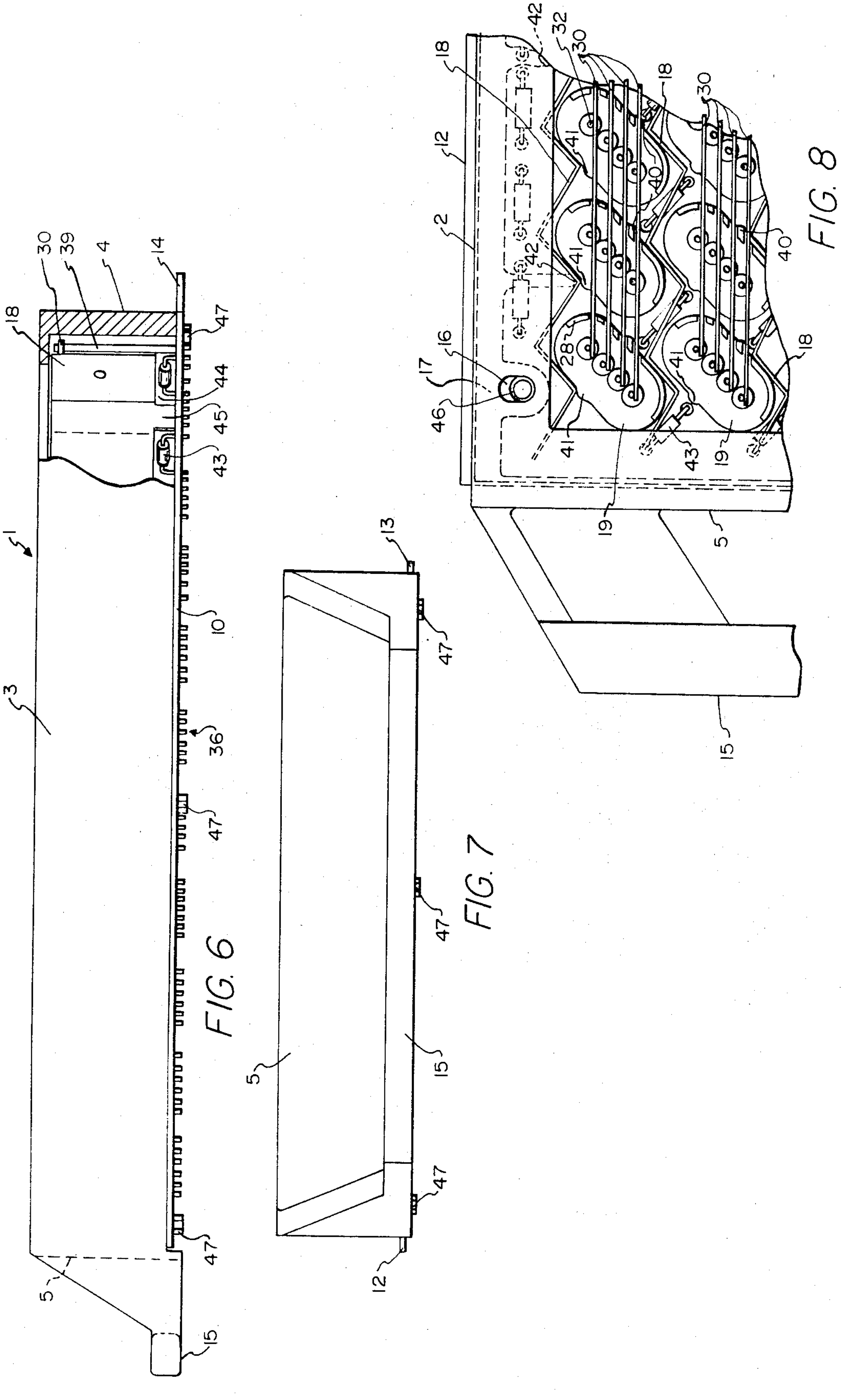
FIG. 6 is a side view of a module partly in section and with parts broken away employed in accordance with the invention.
FIG. 7 is an end view of the module shown in FIG. 6.
FIG. 8 is a partial plan view of a portion of the module shown in FIG. 6.

Each of the bobbins 19 contains projections 40 and 41 on opposite sides thereof which are adapted to fit against shields 18 in order to hold the shields in place as shown in FIG. 8. The opposite sides 2 and 3 of housing 1 contain integrally molded inwardly projecting members 42 which fit into the valleys of the two outer shields 18 disposed adjacent the inside of sides 2 and 3 of the housing. These shields are held in place by being disposed with portions thereof in contact with one side of the bobbins 19 and other portions in contact with the projections 41 of bobbins 19.

In a typical assembly as shown in FIGS. 1 and 8 there are four reed capsules in each of the bobbins which are aligned in parallel columns obliquely and which are connected successively to four multipling wires 30 of the reed capsule assembly shown in FIG. 2. Circuits on the circuit board are connected by diodes 43 which in some cases must cross over space ordinarily occupied by shields 18 and therefore shields 18 are provided with recessed areas 44 as shown in FIG. 4, thus permitting the placement of the diodes without substantially impairing the effectiveness of the shields. In this arrangement each electrically conducting shield extends longitudinally along the ends of the oblique rows of reed capsules and because of the zig zag configuration the shields partially penetrate between said rows. In addition it should be noted that the tops of the shields 18 extend beyond the multipling wires 30 which increases the effectiveness of the shielding action.

In assembling the switch, the basic printed circuit card is first constructed. This has copper conductors on both sides and it is necessary to place the plastic electrical insulating sheet 17 over the circuit card before adding shields 18 to prevent the lower portions 45 of shields 18 from shorting across the copper conductors. After this, the diodes, resistors and rows and columns of bobbins are inserted into the board. Next, groups of reed capsules as shown in FIG. 2 are inserted in the bobbins in the row arrangement shown in FIGS. 1 and 8, with the end wire 39 extending into the hole in the printed circuit card to bring down the connection from the particular row of reed capsules into circuitry of the printed circuit card. In placing the reed capsules the multipling wires 30 are received in slots 29 of the bobbins 19. Thus a plurality of reed capsules with associated magnetic windings are arranged in columns and longitudinally in oblique rows parallel to one another. The electrically conducting shields 18, preferably made of a ferrous metal, are disposed so that, due to their zig zag configuration, they partially penetrate between the rows. At the same time they are held in place by projections 40 and 41 on the bobbins and in the case of the outer shields adjacent the outer sides of the modules by inwardly extending projections 42 disposed in the valley portions of the shields. The slots 29 in the bobbins serve to hold the multiple wires 30 in place and also provide an insulating barrier between adjacent multiple wires when the unit is dropped into place.

After the reed capsules, bobbins and diodes have been inserted through the board, then the unit is passed through a wave soldering process to make the final connections to the printed circuit board. Next the zig zag shields are placed between the rows of crosspoints and also one adjacent the top and bottom row of crosspoints. After the shields have been inserted then the frame or housing 1 is placed over the bobbins and attached to the printed circuit board by means of several screws extending through holes 16 and holes 46 in the insulation sheet 17 and the circuit board 10. These screws are secured by nuts 47 (see FIG. 6) or in any other suitable manner. The inwardly extending projections 42 in housing 1 and the projections 41 outside of bobbins 19 hold the upper and lower shields 18 which otherwise would fall away from the bobbins. The intermediate shields are held between the projection portions 40 and 41 of the various bobbins.

Typically a number of these matrix assemblies are vertically mounted into a rack. The mounting rack contains slots adapted to receive the outwardly extending portions 12 and 13 of the circuit board and thus by grasping the handle 15 of the module and placing the projections 12 and 13 in the slots of the mounting rack with the projecting portion 14 extending inwardly, the switch assembly is guided into contact with a suitable connector on the rack.

It will be understood that variations and modifications may be made in the practical application of the invention and in the specific structure without departing from the invention. For the purpose of illustration some components have been referred to as diodes but it will be understood that various types of electrical components, including resistors, can be employed in various circuits. It will also be understood that the invention is not limited to any particular number of reed capsules, although it contemplates the use of a plurality of reed capsules. Nor is the invention concerned with any particular type of circuitry except to the extent that the circuitry involves the use of a reed capsule crosspoint matrix switch.

The invention is hereby claimed as follows:

1. A modular in-line crosspoint matrix switch comprising:

a. a self-supporting molded electrically insulating housing having opposing sides defining a predetermined area;

b. a single printed circuit board connected to said housing to partially enclose said area, said circuit board containing thereon conductors with apertures therein at spaced intervals, said apertures being aligned obliquely in parallel relation in predetermined groups and longitudinally in parallel relation to one another;

c. a plurality of reed capsule assemblies each comprising two or more reed capsules mounted in a bobbin, said reed capsules each containing reed contact blades, said bobbins being formed of a molded electrical insulating material, means at one end of said bobbins to electrically connect said conductors of said circuit board and said reed blades of said reed capsules, a magnetic winding on each of said bobbins, means to electrically connect said windings to said obliquely arranged apertures in said circuit board;

d. a plurality of wires parallel to one another spaced from said circuit board, running longitudinally over said bobbins and connected to said reed contact blades;

e. means electrically connecting said wires of (d) to conductors of said circuit board of (b);

f. an electrically conducting sheet extending adjacent rows of said bobbins and longitudinally in zig-zag fashion to provide a shield.

2. A switch as claimed in claim 1 including means for insulating said shield from said circuit board.

3. A switch as claimed in claim 1 in which said circuit board extends beyond each of two opposing sides of said housing and has terminals connected to said conductors extending beyond one of the other sides of said housing.

4. A switch as claimed in claim 3 in which said housing contains a handle integrally molded with a side of said housing opposite the side containing said terminals.

5. A switch as claimed in claim 1 in which said bobbins of (c) contain outwardly extending portions at one end having parallel obliquely arranged open slots to receive said wires of (d).

6. A switch as claimed in claim 1 in which said bobbins of (c) have openings in one end thereof to provide passageways for wires to electrically connect said windings to said obliquely arranged apertures in said circuit board.

7. A switch as claimed in claim 1 in which said bobbins of (c) contain on opposite sides thereof projections to assist in maintaining said shields of (f) in place.

8. A switch as claimed in claim 1 in which said wires of (d) are of ferrous metal.

9. A switch as claimed in claim 8 in which said wires of (d) are approximately 0.025 inch in diameter.

10. A switch as claimed in claim 8 in which said wires are welded to wires connected to reed blades of said reed capsules.

11. A switch as claimed in claim 1 in which said shield of (f) extends outwardly beyond said wires of (d).

12. A switch as claimed in claim 1 in which said housing contains a shield of (f) adjacent an inner side of said housing, said side containing containing inwardly projecting portions to contact said shield to assist in holding it in place.

13. A switch as claimed in claim 2 in which the side of said shield of (f) adjacent said insulation means contains recessed areas to accommodate electrical connecting means between rows of conductors on said circuit board.

14. A switch as claimed in claim 2 in which said insulating means is a plastic sheet.

15. A switch as claimed in claim 1 in which said shield is made of a ferrous metal.

16. A reed capsule assembly for a cross-point matrix switch including zig-zag shaped shields interposed adjacent to rows of crosspoints, said assembly comprising two or more reed capsules each containing reed contact blades mounted in a bobbin, said bobbin being formed of a molded electrical insulating material having passageways in said bobbin to receive said capsules, one or more magnetic windings on said bobbin around said passageways, electrical connecting means for said reed blades, and said bobbin including projections on opposite sides thereof for positioning said shields.

17. A crosspoint matrix switch comprising in combination a plurality of reed capsules with associated magnetic windings arranged in columns and longitudinally in oblique rows parallel to one another, and an electrically conducting shield extending longitudinally along the ends of said rows, said shield having a zig-zag configuration so as to partially penetrate between said rows.

18. A switch as claimed in claim 17 in which said shield is made from a ferrous metal.

* * * * *